(12) United States Patent
Agnew et al.

(10) Patent No.: US 6,304,819 B1
(45) Date of Patent: Oct. 16, 2001

(54) LOCATING POSITIONS ON MAPS

(75) Inventors: Hugh John Agnew, West Perth (AU); Gwyn David Walter Parfitt, Jersey (GB)

(73) Assignee: Yeoman Marine Limited, Hampshire (GB)

( * ) Notice: Subject to any disclaimer, the term of this patent is extended or adjusted under 35 U.S.C. 154(b) by 0 days.

(21) Appl. No.: 09/077,118

(22) PCT Filed: Nov. 19, 1996

(86) PCT No.: PCT/GB96/02849

§ 371 Date: Jul. 20, 1998

§ 102(e) Date: Jul. 20, 1998

(87) PCT Pub. No.: WO97/19322

PCT Pub. Date: May 29, 1997

(30) Foreign Application Priority Data

Nov. 21, 1995 (GB) .................................................. 9523822

(51) Int. Cl.⁷ .............................. G01C 21/00; G06G 7/78
(52) U.S. Cl. .......................... 701/207; 701/208; 701/211; 701/212; 340/990; 340/995; 342/357.13; 342/452; 345/113; 73/178 R
(58) Field of Search .................................... 701/207, 208, 701/209, 212, 211, 202, 213, 216, 200; 340/988, 990, 995, 971; 342/357.13, 457, 452, 357.06, 357.08, 451; 345/133, 139, 427, 429, 112, 113; 73/178 R (56) References Cited

U.S. PATENT DOCUMENTS

| | | | |
|---|---|---|---|
| 3,760,360 | 9/1973 | Reynolds et al. | 340/166 R |
| 4,312,577 | 1/1982 | Fitzgerald | 353/12 |
| 4,513,377 | 4/1985 | Hasebe et al. | 364/449 |
| 4,631,678 | 12/1986 | Angermüller et al. | 364/424 |
| 4,862,374 | 8/1989 | Ziemann | 364/449 |
| 5,089,816 | 2/1992 | Holmes, Jr. | 340/995 |
| 5,113,178 | 5/1992 | Yasuda et al. | 340/709 |
| 5,268,844 | * 12/1993 | carver et al. | 701/207 |

(List continued on next page.)

FOREIGN PATENT DOCUMENTS

| | | |
|---|---|---|
| 3801 415 A1 | 7/1989 | (DE) . |
| 0 382 592 A1 | 8/1990 | (EP) . |
| 0 389 946 A3 | 10/1990 | (EP) . |
| 0 559 355 A1 | 9/1993 | (EP) . |
| 0 597 500 A2 | 5/1994 | (EP) . |
| 2 695 496 A1 | 3/1994 | (FR) . |
| 2 043 909 | 3/1979 | (GB) . |
| 2 272 519 | 5/1994 | (GB) . |
| 5-216401 | 8/1993 | (JP) . |
| 2611585 | 2/1997 | (JP) . |
| WO 87/07013 | 11/1987 | (WO) . |
| WO 90/08373 | 7/1990 | (WO) . |
| WO 95/01551 | 1/1995 | (WO) . |
| WO 95/22742 | 8/1995 | (WO) . |

Primary Examiner—Jacques H. Louis-Jacques
(74) Attorney, Agent, or Firm—Cobrin & Gittes (57) ABSTRACT

An apparatus to enable one's position to be easily found on a traditional map having its own coordinate system distinct from a wide area coordinate system, data is associated with the map from which the relationship—between the map coordinate system and the wide area coordinate system can be determined. The apparatus has a reader for reading the data associated with the map, a memory for storing the read data, a GPS receiver for receiving transmissions from GPS satellites and determining the position of the GPS receiver in terms of the wide area coordinate system, a processor for processing the determined wide area coordinate position and the stored data to determine the position of the GPS receiver in terms of the map coordinate system, and a display or the like for annunciating to a user the determined map coordinate position. The data associated with the map preferably also includes information on the area covered by the map. The map may be one of a series of maps or part of an atlas, the data relating to all of the maps in the series or atlas.

29 Claims, 4 Drawing Sheets

U.S. PATENT DOCUMENTS

| | | | |
|---|---|---|---|
| 5,278,763 | * | 1/1994 | Agnew et al. ........................ 701/207 |
| 5,385,371 | * | 1/1995 | Izawa ..................................... 283/34 |
| 5,422,814 | | 6/1995 | Sprague et al. ....................... 364/449 |
| 5,557,524 | * | 9/1996 | Maki ...................................... 701/35 |
| 5,566,073 | * | 10/1996 | Margolin .............................. 701/213 |
| 5,581,259 | | 12/1996 | Schipper .............................. 342/451 |
| 5,596,500 | | 1/1997 | Sprague et al. ................... 364/449.7 |
| 5,848,373 | * | 12/1998 | DeLorme et al. .................... 701/208 |

* cited by examiner

LOCATING POSITIONS ON MAPS

This invention relates to the location of positions on maps.

Various systems are on the market for facilitating the location of one's position on a map. One example, called the Silva GPS Compass, marketed by Silva Sweden AB, of Sollentuna, Sweden, is a portable device which includes a global positioning system ("GPS") receiver and can display the current position of the receiver in terms of longitude and latitude with an accuracy of about 100 m under the current level of "selective availability" applied by the US Department of Defense who operate GPS. When used with a map having longitude and latitude grid lines, one's position on the map can be located. However, there are two main disadvantages with this system. First, many maps (particularly road and street atlases and street plans) do not have any longitude and latitude markings whatsoever. Many other maps (for example British Ordnance Survey ("OSGB") maps), although having longitude and latitude markings around their border and 5 minute graticule markings on the map, do not have any longitude and latitude grid lines drawn across the map. Thus it can be difficult to locate one's position on the map. Second, because longitude and latitude is a global co-ordinate system, much more information is provided by full longitude and latitude co-ordinates than is actually required to locate one's position on a map covering only a minuscule part of the surface area of the planet, and this can lead to confusion. For example, the old UK Patent Office building in Southampton Buildings, off Chancery Lane, London is situated at (51°30'59" N, −0°06'34" E), but it is difficult to locate that position on the relevant map in the OSGB 1:50,000 Landranger Second Series, Sheet 176, which covers latitudes 51°19' N approximately and longitudes −0°03' E to −0°38' E approximately, but without any longitude and latitude grid lines. Many GPS receivers also produce co-ordinates in various map-grid systems relevant to different countries' mapping systems. The conversion between latitude and longitude and such map-grid systems is made using known and documented algorithms. Throughout this specification, latitude and longitude is therefore used as an example of any wide-area co-ordinate system as hereinafter defined.

A system which deals with some of the above problems is foreshadowed in patent document WO-A-87/07013 and is marketed by Yeoman Marine Limited, of Lymington. Hampshire, United Kingdom, under the name "Navigator's Yeoman". Also, an accessory is available for the Silva GPS compass, called the "Silva Yeoman Navimap", which has a similar effect. These systems use (a) a digitising table on which a traditional map can be placed, (b) a cursor which is movable across the map on the table and has indicators to indicate a required direction of movement, (c) a GPS receiver (or an input to receive signal from a separate GPS receiver) from which one's current position can be determined, and (d) a processor which determines, from the cursor position on the digitising table and the current GPS position, which way the cursor should be moved so that it is over the current position and activates the indicator lights on the cursor accordingly. Whilst this system has the advantages that it can be used with any traditional map to any scale and of any part of the world, and one's current position can be located by following the indicators rather than thinking in terms of latitude and longitude, it does suffer from two disadvantages. First, before it can be used, the map must be manually referenced with respect to the digitising table so that the processor can translate between the latitude and longitude co-ordinates obtained from the GBS receiver and the co-ordinates of the digitiser table. Referencing can be performed by placing the cursor at two (and preferably three) positions on the chart, and at each position instructing the processor with the latitude and longitude co-ordinates of that position. Alternatively, when used for relative, rather than absolute, positioning when one's current position on the map is known, referencing can be carried out by registering the cursor on the current known position on map and then indicating to the apparatus the north direction of the map and its scale. Second, it requires the use of a digitising table which is as large as the map, or at least as large as a folded portion of the map which is to be viewed at one time without re-referencing.

Another apparatus which deals with this problem is described in patent document WO-A-95/22742, in which a paper map is placed behind a transparent liquid crystal display which can cover the whole area of the map. The map has a mark, for example in the form of a bar code, which can be read by the apparatus and used to correlate positions on the map with latitude and longitude positions. The apparatus also includes a GPS receiver, and the current portion obtained from the receiver is converted into a map position, which is then indicated on the LCD by a graphic image, such as crosshairs, to show the current position on the map. However, this apparatus suffers from a number of disadvantages. First, a liquid crystal graphic display is required which is as large as the map, which is thus expensive, cumbersome and liable to be damaged. Second, it is necessary for the map to be used opened out, and the apparatus cannot apparently deal with folded maps. Third, the apparatus can apparently be used only with single sheet maps.

One solution to these problems is to "computerise" the map. In the SkyMap system marketed by Skyforce Avionics Limited of Ramsgate, Kent, United Kingdom, which is primarily designated for aircraft navigation, a representation of the map is held in computer memory. The current position is determined using a GPS receiver, and a relevant part of the map, together with the current position, is displayed on a liquid crystal graphic display. The disadvantages of this sort of system are that (a) it would be extremely expensive if a large, high-resolution, map and colour display were to be used; and (b) many people prefer to use a traditional map. The SkyMap system also has the ability to display the full OSGB grid co-ordinates of the current position so that the position can be located on an OSGB map. However, OSGB maps are not indexed according to the grid references covered, only according to sheet numbers, and the sheet numbers depend on the scale and series of maps. Therefore it is not straightforward to select the appropriate map. Also, for a resolution of 100 m, the full eight digit (or two letter and six digit) OSGB grid reference is not needed and not normally used when referring to a particular 1:50,000 sheet, and therefore providing all eight digits can lead to unnecessary confusion.

The present invention is concerned with dealing with the problems mentioned above of the known systems.

In this specification, the following terms are intended to have the following meanings: "Traditional man" means a map which is printed on paper, linen, plastics sheet or the like; "Man co-ordinate system" means a system of co-ordinates which are normally used to define a position on a particular map, and differs from a "Wide-area co-ordinate system" which includes the longitude and latitude system for defining positions on the earth's surface, but also includes other co-ordinate systems. For example, when considering a single map in the OSGB 1:50,000 series, for instance Sheet 176 mentioned above, the co-ordinates (312, 815) are co-ordinates according to the map co-ordinate system for the map, and differ not only from the co-ordinates (51.5164° N, −0.1095° E) according to the longitude and latitude co-ordinate system but also from the full OSGB co-ordinates (5312, 1815) or (TQ, 312, 815) according to the complete wide-area OSGB co-ordinate system; and "Wide-area position transmitting system" means a system which transmits signals which can be received over a large area and which can be processed so as to determine the receiver's position in terms of a wide-area co-ordinate system. An example of a wide-area position transmitting system is "GPS", which is operated by the US Department of Defense and comprises a couple of dozen or so transmitters which orbit the earth and transmit signals. When the signals from three or more transmitters are being received at a single site, they can be processed so as to determine the position of that site in terms of longitude and latitude. However, the term "wide-area position transmitting system" is intended to include not only other satellite positioning systems, but also terrestrial positioning systems which rely on transmissions from land-based transmitters, and from which one's position in terms of a wide-area co-ordinate system can be determined.

SUMMARY OF THE INVENTION

In accordance with a first aspect of the present invention, there is provided a position indicating apparatus for use with a plurality of printed map sheets, each of which is divided into a plurality of grid blocks which are referenced by a respective grid reference, the apparatus being positionable over different portions of each map sheet and comprising: a body which is adapted to be positioned on a portion of a said map sheet and which is provided with a transparent display through which a grid block of the map sheet will be visible; position sensing means operable to receive signals from a positioning system and for generating therefrom a position indicating signal indicative of the geographical location of said body; storage means operable for storing data relating to the respective geographical area covered by the respective map sheets of said plurality; processing means for processing said position indicating signal with said stored data for generating first output data indicative of which of said map sheets includes the geographical location indicated by said position indicating signal and indicative of the grid reference of the grid block of the indicated map sheet which contains said geographical location and second output data indicative of the position of said geographical location within the indicated grid block; output means for outputting to a user information corresponding to said first output data for enabling the user to select the indicated map sheet and to position said transparent display of said body over said indicated grid block of said map sheet; and a movable indicator responsive to said second output data for providing within said transparent display a visual indication of the position of said geographical location within said indicated grid block of said map sheet.

According to this aspect, the present invention also provides a method of indicating a position of a user on at least one of a plurality of predetermined printed map sheets, each of which is divided into a plurality of grid blocks which are referenced by a respective grid reference using a position indicating apparatus having a body which is positionable over different portions of each map sheet and which is provided with a transparent display through which a grid block of a said map sheet will be visible, the method comprising the steps of:

receiving signals from a positioning system and generating therefrom a position indicating signal indicative of the geographical location of said body;

storing data associated with said predetermined map sheets and which relates to the respective geographical areas covered by the respective maps of said plurality;

processing said position indicating signal with said stored data to generate first output data indicative of which of said map sheets includes the geographical location indicated by said position indicating signal and indicative of the grid reference of the grid block of the indicated map sheet which contains said geographical location and second output data indicative of the position of said geographical location within the indicated grid block;

outputting to the user information corresponding to said first output data;

selecting the indicated map sheet;

positioning said transparent display of said body over said indicated grid block of said map sheet; and providing a movable indicator responsive to said second output data to provide within said transparent display a visual indication of the position of said geographical location within said indicated grid block of said map sheet.

The invention therefore provides the following advantages over the known systems described above:

1. There is no need for a digitising surface or the like.
2. Traditional maps can be used, the only requirement being the additional data associated with the map, this being possible at low cost.
3. The user does not have any difficulty in selecting the appropriate map.
4. The user does not need to concern themself with latitude and longitude, but instead co-ordinate data is provided which is more relevant to the map being used. Using the example given above, instead of (or in addition to) being presented with the latitude and longitude co-ordinates (51°30'59" N, −0°06'34" E), the user might instead be presented with the abbreviated OS grid block for the position on Sheet 176, i.e. "(31,81)" or with the abbreviated higher resolution grid reference "(312,815)".
5. Referencing is carried out simply by entering the data associated with the map.

In the case where some portions of the maps overlap, and in the case of a position falling on more than one of the maps: the processing means is preferably operable to determine (a) the identify of two or more of the maps which cover the position of the receiving means, and (b) the position(s) of the body on those maps in terms of the co-ordinate system(s) of those maps; the output means being operable to output to the user (a) the identities of those maps and (b) each determined position in terms of the co-ordinate position of the respective map.

Figure 1:
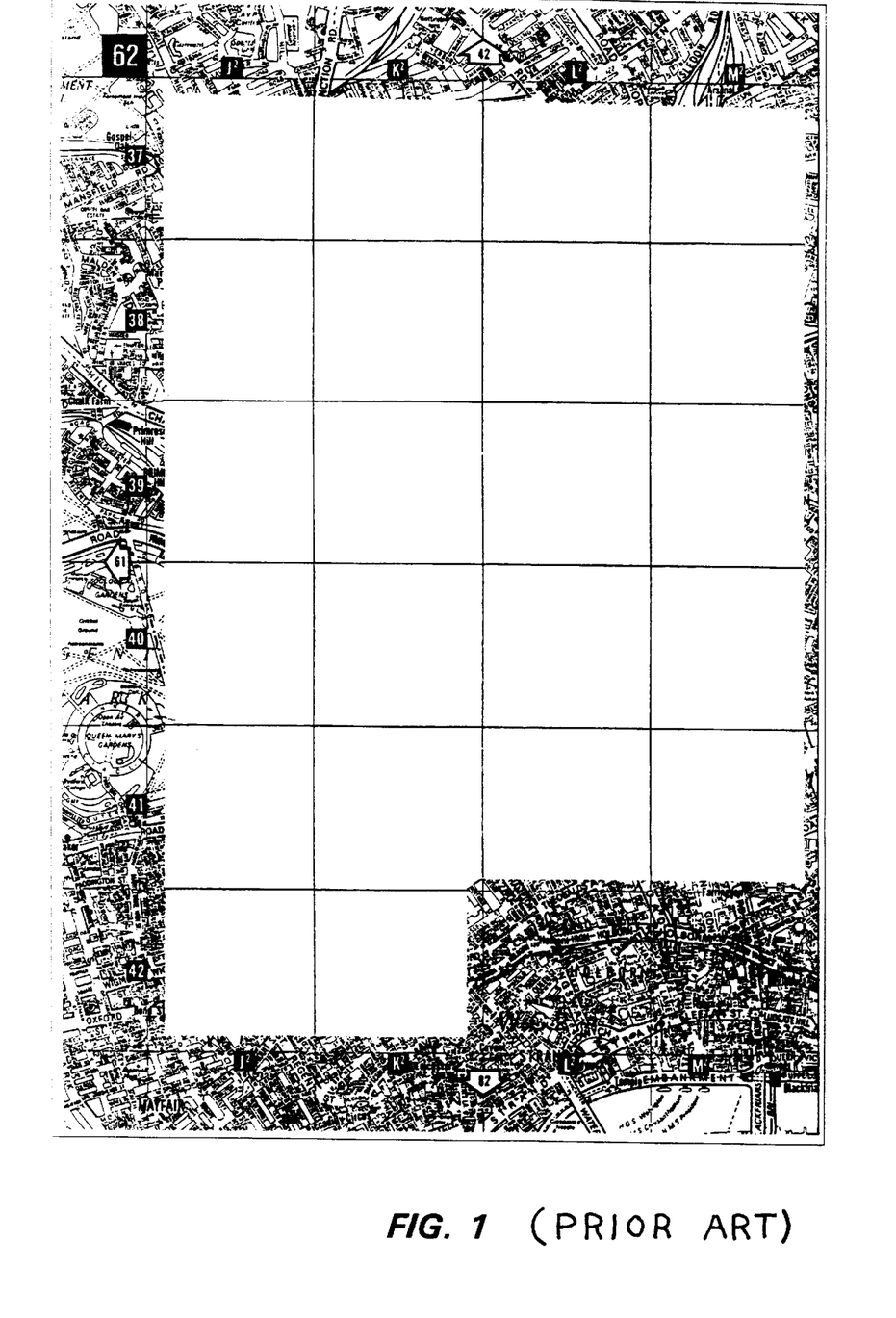
FIGS. 1–3 show portions of pages 62, 173 and 186, respectively, of the Master Atlas of Greater London, Edition 4(B), published by Geographers' A–Z Map Company Limited, Sevenoaks, Kent.
Figure 2:
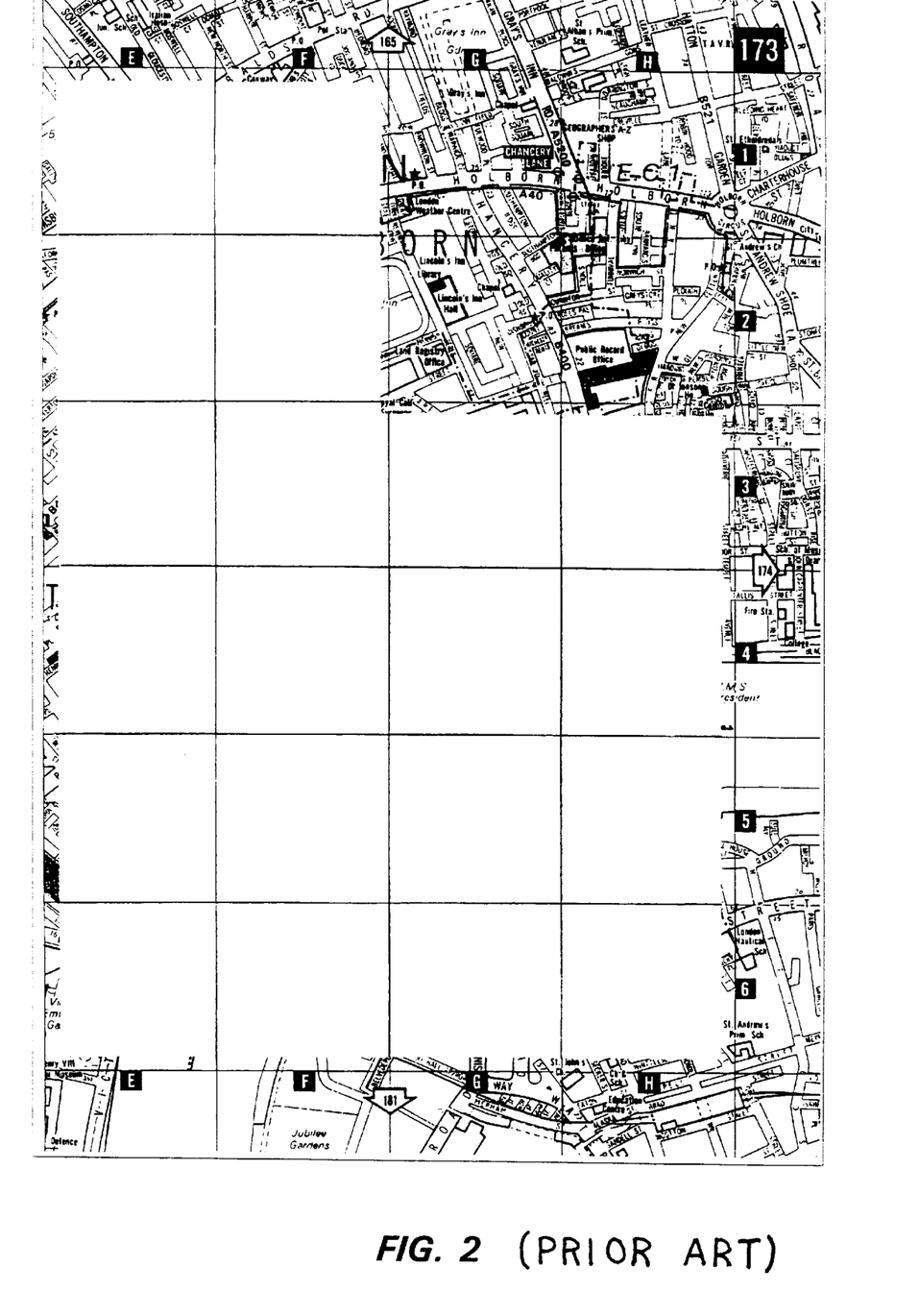
Figure 3:
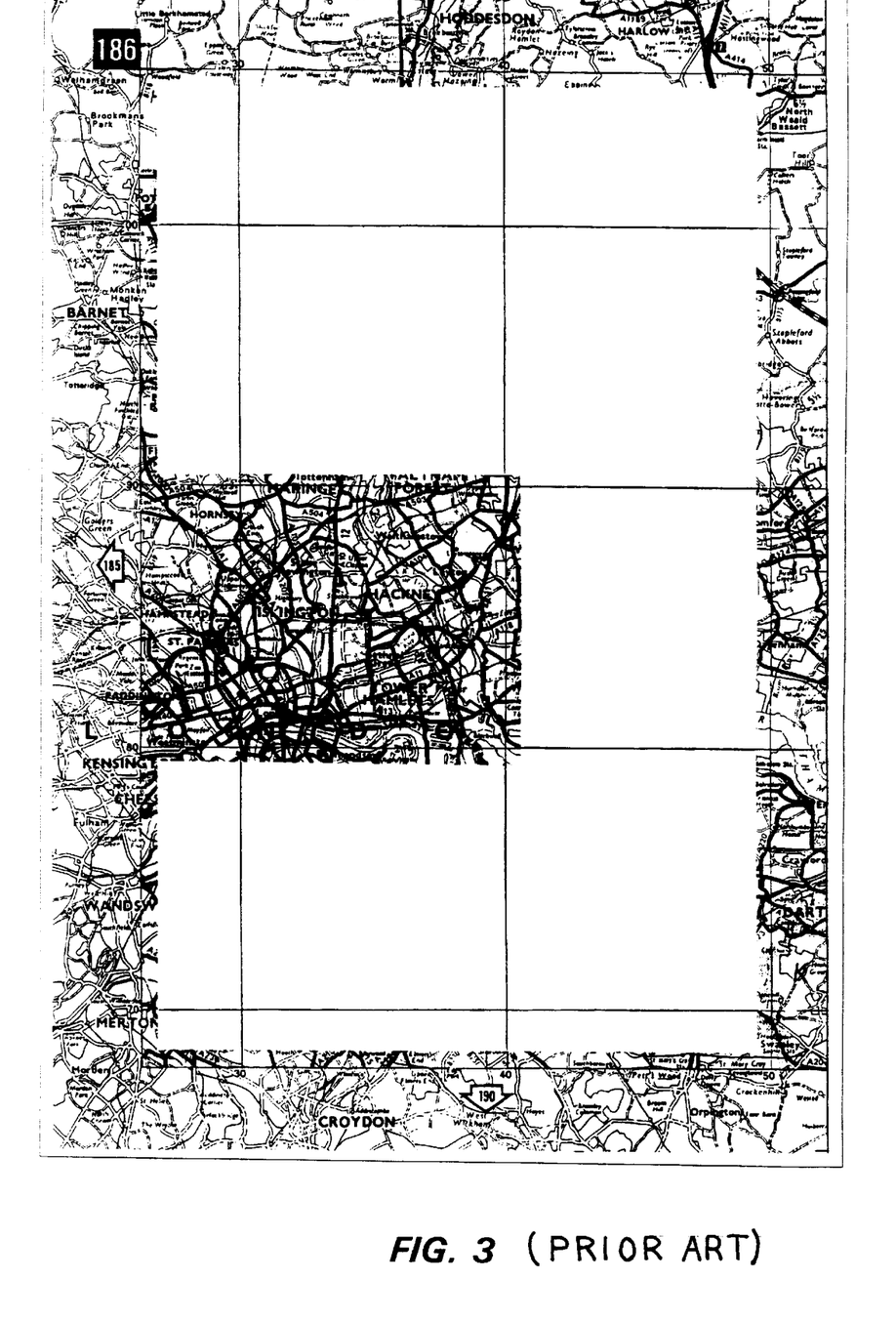

Not all of the maps in the series or atlas need to be to the same scale, and in this case the data associated with the maps may take into account the different scales of the maps. For example, the Geographers' A–Z Master Atlas of Greater London, Edition 4(B), has a first set of maps on pages 2 to 160 covering Greater London to a scale of 3" to 1 mile (1:21,120), a second set of maps on pages 162 to 183 covering central London to a larger scale of 9" to 1 mile (1:7,040) and a third set of maps covering London and its environs to a smaller scale of 2½ miles to 1" (1:158,400). The site of the old UK Patent Office building off Chancery Lane is covered by all three sets of maps, on pages 62, 173 and 186, as shown in FIGS. 1, 2 and 3, respectively, of the accompanying drawings. In accordance with this feature of the invention, the position of that building could be output as "Page 62, Block M 42", "Page 173, Block G 2" and "Page 186, Block (30,80)", simultaneously, or one after another.

The invention is particularly advantageous in the case where the series of maps are bound together in the form of an atlas. The apparatus can then tell the user to which page of the atlas to turn, and where on the page to look.

The data associated with the maps is preferably provided on or in the map or atlas, for example in the form of a bar code or magnetic stripe printed on the map or inside cover of the atlas, or a smart code forming an additional page to the atlas, or which is removably inserted in a pocket or the like on the map or in the atlas.

The data associated with the maps may include at least one parameter related to the cartographic projection of the or each map, so that the system can accurately locate positions on maps employing different cartographic projections.

The data associated with the map(s) may be machine-readable, with data receiving means being provided for reading the machine-readable data. Alternatively, the data may be provided as user-readable encoded text, with the data receiving means comprising means (such as a keypad) to enable a user to enter the encoded text and means for decoding the entered text.

BRIEF DESCRIPTION OF THE DRAWINGS

A specific embodiment of the invention and some modifications and developments thereto will now be described by way of example with reference to the accompanying drawings, in which.

Conversion of Wide-area Co-ordinates to Map Co-ordinates

In the remainder of this description: $\theta$ and $\phi$ denote the wide area co-ordinates of a position on the surface of the earth in terms of longitude ($\theta$) and latitude ($\phi$) with the sign convention that east of the Greenwhich meridian is positive and north of the equator is positive, $\psi$ denotes the product of the longitude and the cosine of the latitude of a position on the surface of the earth, i.e.:

$$\psi = \theta \cdot \cos\phi \qquad \ldots (1)$$

and x and y denote coordinates (in the usual directions) of a position on a map in terms of the map's own co-ordinate system.

In the apparatus of the embodiments, is necessary to convert from ($\theta$, $\phi$) to (x, y). In a simplistic "flat-earth" model for maps covering a small part of the earth's surface, it can be assumed that, for a particular map, x and y are each linear functions of $\psi$ (=$\theta \cdot \cos\phi$) and $\phi$, i.e.:

$$(x \quad y) = (\psi \quad \phi \quad 1) \cdot \begin{pmatrix} a & b \\ c & d \\ e & f \end{pmatrix} \qquad (2)$$

Assuming that the x direction of the map is approximately parallel to the lines of latitude, then in the conversion matrix above, the elements a and d relate predominantly to the scale of the map in the x and y directions, the elements e and f relate predominantly to the position of the map, and the elements b and c account for any skew between the x direction of the map and the lines of latitude. By taking the wide-area co-ordinates ($\theta_1$, $\phi_1$), ($\theta_2$, $\phi_2$), ($\theta_3$, $\phi_3$) of three positions on the surface of the earth and by taking the map co-ordinates ($x_1$, $y_1$), ($x_2$, $y_2$), ($x_3$, $y_3$) of the corresponding three positions on a particular map, it is possible to formulate six simultaneous equations derived from Formula 2 which can be represented by:

$$\begin{pmatrix} x_1 & y_1 \\ x_2 & y_2 \\ x_3 & y_3 \end{pmatrix} = \begin{pmatrix} \psi_1 & \phi_1 & 1 \\ \psi_2 & \phi_2 & 1 \\ \psi_3 & \phi_3 & 1 \end{pmatrix} \cdot \begin{pmatrix} a & b \\ c & d \\ e & f \end{pmatrix} \qquad (3)$$

These simultaneous equations can then be solved to obtain the unknown values a to f of the conversion matrix by multiplying both sides by the inverse of the matrix containing the wide-area co-ordinates:

$$\begin{pmatrix} a & b \\ c & d \\ e & f \end{pmatrix} = \begin{pmatrix} \psi_1 & \phi_1 & 1 \\ \psi_2 & \phi_2 & 1 \\ \psi_3 & \phi_3 & 1 \end{pmatrix}^{-1} \cdot \begin{pmatrix} x_1 & y_1 \\ x_2 & y_2 \\ x_3 & y_3 \end{pmatrix} \qquad (4)$$

$$\therefore \begin{pmatrix} a & b \\ c & d \\ e & f \end{pmatrix} = \frac{\begin{pmatrix} \phi_2 - \phi_3 & \phi_3 - \phi_1 & \phi_1 - \phi_2 \\ \psi_3 - \psi_2 & \psi_1 - \psi_3 & \psi_2 - \psi_1 \\ \psi_2\phi_3 - \psi_3\phi_2 & \psi_3\phi_1 - \psi_1\phi_3 & \psi_1\phi_2 - \psi_2\phi_1 \end{pmatrix} \cdot \begin{pmatrix} x_1 & y_1 \\ x_2 & y_2 \\ x_3 & y_3 \end{pmatrix}}{(\psi_1 \quad \psi_2 \quad \psi_3) \cdot \begin{pmatrix} \phi_2 - \phi_3 \\ \phi_3 - \phi_1 \\ \phi_1 - \phi_2 \end{pmatrix}} \qquad (5)$$

As an example, considering the above-mentioned OSGB map sheet 176, and taking the three positions as the bottom-left corner, bottom-right corner and the midpoint along the top edge of the map, this gives:

$(x_1, y_1) = (495 \text{km}, 160 \text{km})$  $(\theta_1, \phi_1) = (-0.6367°, 51.3308°)$  $\therefore \psi_1 = -0.39782°$ $(x_2, y_2) = (535 \text{km}, 160 \text{km})$  $(\theta_2, \phi_2) = (-0.0628°, 51.3225°)$  $\therefore \psi_2 = -0.03925°$ $(x_3, y_3) = (515 \text{km}, 200 \text{km})$  $(\theta_3, \phi_3) = (-0.3358°, 51.6860°)$  $\therefore \psi_3 = -0.20819°$ Using formula 5, the conversion matrix for sheet 176 is therefore:

$$\begin{pmatrix} a & b \\ c & d \\ e & f \end{pmatrix} = \begin{pmatrix} 111.47994 \text{km}/° & 2.574881 \text{km}/° \\ -3.2092944 \text{km}/° & 111.23796 \text{km}/° \\ 704.10065 \text{km} & -5548.9032 \text{km} \end{pmatrix} \qquad (6)$$

To evaluate the accuracy of conversion, the wide-area co-ordinates for the other two corners of sheet 176 are ($\theta_4$, $\phi_4$)=(−0.6250°, 51.6904°) and therefore $\psi_4$=−0.38744° at the top-left corner and ($\theta_5$, $\phi_5$)=(−0.0464°, 51.6817°) and therefore $\psi_5$=0.02877° at the top-right corner. Applying the conversion formula 2 using the conversion matrix of formula 6 for sheet 176 gives map co-ordinates $(x_4, y_4)$= (495.019 km, 200.023 km) and $(x_5, y_5)$=(535.032 km, 199.990 km). On the map, the co-ordinates of these two corners are, in fact, (495 km, 200 km) and (535 km, 200 km), and thus there are discrepancies of:

$\sqrt{((495.019-495)^2+(200.023-200)^2)}$ km=30 m; and $\sqrt{((535.032-535)^2+(199.990-200)^2)}$ km=34 m which are less than the inaccuracy provided by GPS and therefore not a limiting factor. On the paper of the map, the discrepancies are 1/50,000 of these amounts, that is 0.60 mm and 0.68 mm, respectively.

Testing whether a Position is within the Boundary of a Map

When the invention is applied to a single map, it is preferable that a determination is made as to whether the current position is within the boundary of the map, so as to avoid attempting to calculate and annunciate map co-ordinates which are not covered by the map. Also, when the invention is applied to a series of maps, it is preferable that a determination is made as to whether the current position is within the boundary of any of the maps, and if so which one(s). Due to the nature of the longitude and latitude wide-area co-ordinate system, relatively few maps have boundaries which extend along lines of constant longitude or constant latitude. It would be possible to develop a formula defining each boundary line in terms of both longitude and latitude. However, the invention preferably takes advantage of the fact that the majority of maps are square or rectangular and their boundaries run parallel and at right angles to the map's co-ordinate system. Accordingly, it will be appreciated, from formula 2, that if the co-ordinates of the bottom-left and top-right corners of a map are $(x_L, y_B)$ and $(x_R, y_T)$, respectively, then a position having wide-area co-ordinates $(\theta, \phi)$ and accordingly a value $\psi=\theta.\cos\phi$ will fall on the map if it satisfies both of the relationships:

$$x_L \leq a\psi+c\phi+e \leq x_R \quad \ldots (7)$$

$$y_B \leq b\psi+d\phi+f \leq y_T \quad \ldots (8)$$

Thus, given the wide-area co-ordinates $(\theta, \phi)$ of a position, the values a to f of the conversion matric for a particular map, and the co-ordinates $(x_L, y_B)$ and $(x_R, Y_T)$ in terms of the map's co-ordinate system of two, diagonally-opposite corners of the map, it is simple to test whether that position falls on that map.

The mapped region of some maps is not a simple rectangle or square. For example, maps often have a small legend rectangle at one corner. In this case, the mapped area can be divided up into, say, two rectangular sub-maps, each having the same conversion matrix, but with different values of $x_L$, $x_R$, $y_T$ and $y_B$.

Different Co-ordinate Styles

It will be appreciated that different maps have different styles for representing their co-ordinates. For example, the co-ordinates of the grid lines on most OSGB sheets, in each of the x and y directions, consist in full of a three digit number, e.g. the old Patent Office site mentioned above is an OSGB grid block (s31, l81), but the most significant digits are not normally used and are usually marked only at the corners of the map. In the first set of maps in the A–Z master Atlas of Greater London mentioned above, the y co-ordinates of the map blocks are numerical but increasing in the downwards direction, as seen in FIG. 1, and the x co-ordinates are alphabetical with repeats, but the same letter is never repeated on two adjacent pages of the atlas. As shown in FIG. 2, in the second set of maps of that atlas, the x co-ordinates of the map blocks are alphabetical, but re-starting at "A" on each double page. As shown in FIG. 3, the third set of maps are marked with OSGB grid lines at 10 km intervals. In the embodiment of the invention, all map co-ordinates (x, y) are stored and processed numerically until they are displayed, when they are converted into their proper form (X, Y) in dependence upon co-ordinate style codes $S_x$ and $S_y$ for the map or set of maps in question.

The Data Associated with a Map of Maps

In the case of a single map, the data which is provided may comprise: a "single map" flag set at 1 indicating that the data relates to a single map; the six values a to f of the conversion matrix; the four values $x_L$, $x_R$, $y_T$ and $Y_B$ defining the map's boundaries; two codes $S_x$, $S_y$ representing the x and y co-ordinate styles of the map;

the six values a to f of the conversion matrix;

the four values $x_L$, $x_R$, $y_T$ and $Y_B$ defining the map's boundaries;

two codes $S_x$, $S_y$ representing the x and y co-ordinate styles of the map;

data from which the actual size of the grid blocks on the paper of the map can be determined; and the name of the map.

In the example given above, the data might consist of:

111.47994;2.574881;−3.2092944;111.23796;704.10065;−5548.9032;495; 535; 160; 200; $S_x$; $S_y$; "OS Language Series 2 Sheet 176"

The data items may be printed in the form of a bar code or magnetic stripe on the map.

In the case of a series of maps, the data which is provided may comprise:— the single map flag, but set to 0 indicating that the data relates to more than one map;

the name of the series of maps or the atlas (e.g. "A–Z Master Atlas Greater London");

the number S of sets of maps in the series of atlas (e.g. "3");

{for each set of the S sets:—} two codes representing the x and y co-ordinate styles of the maps in that set;

the number M of maps in that set;

{for each map in that set:—} the name of that map (e.g. "Page 62");

the six values a to f of the conventional matrix for that map;

the four values $x_L$, $x_R$, $Y_T$ and $y_B$ defining that map's boundaries; and    data from which the actual size of the grid blocks on the paper of the map can be determined;

{next map}

Construction of the Apparatus

Figure 4:
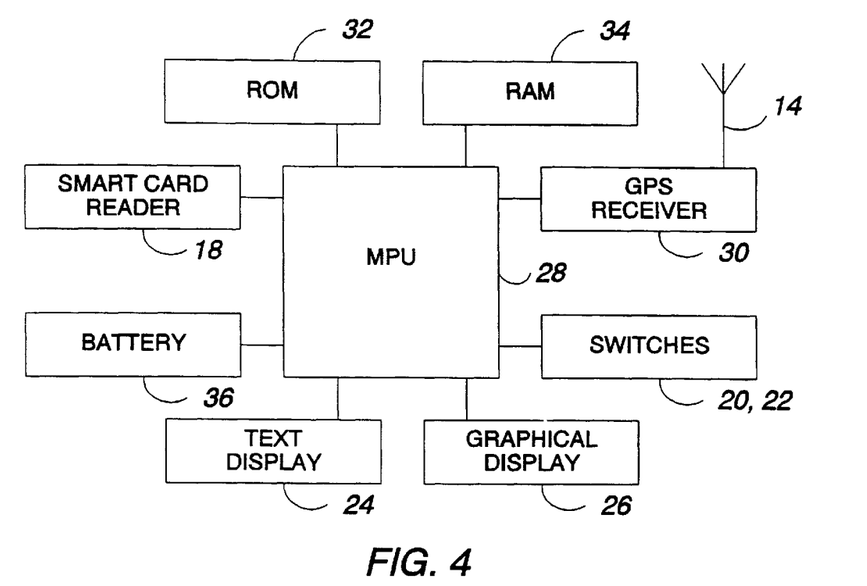
FIG. 4 is a block diagram showing functional elements of one embodiment of apparatus for use in performing the invention.
Figure 5:
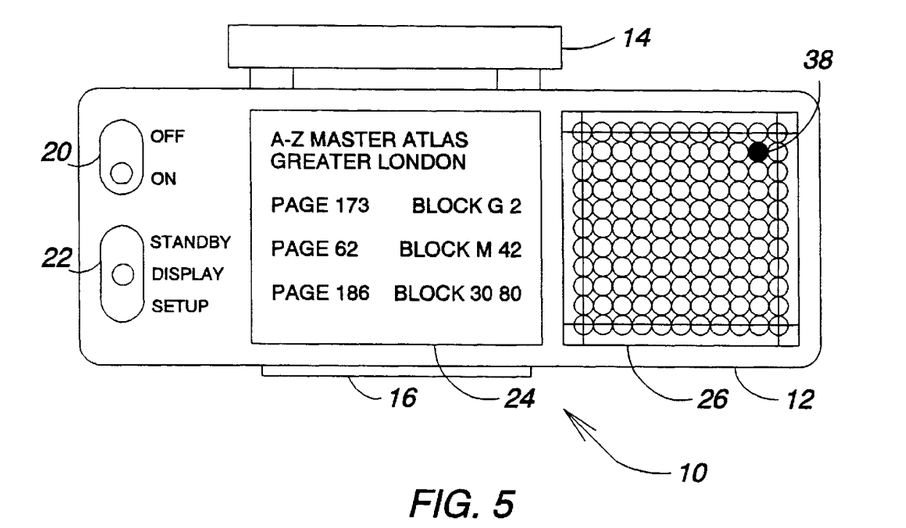
FIG. 5 is a top view of the apparatus of FIG. 4.

Referring to FIGS. 4 and 5, the apparatus 10 is portable, of so-called "palm-top" size, and comprises a casing 12 having a GPS antenna 14 mounted on its top edge and a slot 16 providing access to a smart card reader 18 in its bottom edge. The smart card may form part of a special page of an atlas, or may be removably inserted in a pocket inside the cover of the atlas. Alternatively, the smart card which is insertable into the slot 16 may be a completely separate article, for example containing the data of all 204 sheets in the OSGB Landranger Second Series. The top face of the casing 12 has: an on/off switch 20; a mode switch 22 having standby, display and setup positions; a liquid crystal text display 24; and a liquid crystal graphical display 26. Alternatively, these two displays could be combined into one. The graphical display 24 comprises an 11×11 array of pixels, any one 38 of which can be activated to display a position within a grid block.

Referring in particular to FIG. 4, the casing also contains: a microprocessor unit 28; a GPS receiver 30; ROM 32; ROM 34; and a battery 36. An external power socket may also be provided to receiver power from a mains adaptor to charge the battery or from a vehicle's cigar lighter socket.

Operation of the Apparatus

When the on/off switch 20 is "on", the MPU 28 operates in accordance with a program stored in the ROM 32. When the mode switch 22 is at "setup", the smart card reader 18 is activated, and it can read the data mentioned above associated with the map, series of maps or atlas, and supply it to the MPU 28 for processing and storage in the RAM 34. The GPS receiver 30 is connected to the GPS antenna 14, and when the mode switch 22 is at "display", and GPS receiver 30 is a activated, and when it receives signals from three or more GPS satellites it supplies the current wide-area co-ordinates ($\theta$, $\phi$) to the MPU. When the mode switch 22 is at "display" or "setup", the LCDs 24, 26 are activated. When the mode switch 22 is at "standby", the smart-card reader 18, GPS receiver 30 and LCDs 24, 26 are inactive, but the data which has been read continues to be stored in the RAM 34.

The program stored in the ROM 32 causes the apparatus to operate according to the following routines of steps while the on/off switch is "on":—

Main Routine

| | |
|---|---|
| R1 | Set to 0 a "data present" flag F indicating whether data associated with a map has been read. |
| R2 | If the mode switch 22 is at "display" jump to step R5, or if at "setup" call the Setup subroutine, otherwise if the mode switch 22 is at "standby" continue. |
| R3 | If the displays 24, 26 are on, or the GPS receiver 30 is on, switch them off. |
| R4 | Loop back to step R2. |
| R5 | If the data present flag F is 0, activate the text display 24 to invite the user to switch to "setup" and loop back to step R2, otherwise continue. |
| R6 | If the GPS receiver 30 is off, switch it on. |
| R7 | If the GPS receiver 30 is not producing wide-area co-ordinate signals, activate the text display 24 to inform the user that the GPS position is awaited and loop back to step R2, otherwise continue. |
| R8 | Store the wide-area co-ordinates ($\theta$, $\phi$) from the GPS receiver 30 in the RAM 34. |
| R9 | From the stored wide-area co-ordinates ($\theta$, $\phi$) and Formula 1, calculate the value of $\psi$ and store it in the RAM 34. |
| R10 | If the single map flag in the read data is 1, call the Single Calculation subroutine, otherwise call the Multi Calculation subroutine. |
| R11 | Loop back to step R2. |
| | Setup Subroutine |
| S1 | Switch on the smart card reader. |
| S2 | Activate the text display 24 to invite the user to insert the smart card associated with the map, series of maps, or atlas to be used. |
| S3 | Loop on this step until data has successfully been read, and then continue. |
| S4 | Store the read data in the RAM 34. |
| S5 | Switch off the smart card reader. |
| S6 | Set the data present flag to 1. |
| S7 | Activate the text display 24 to inform the user of the name of the map, series of maps or atlas, and that the data has been successfully read. |
| S8 | If the mode switch is at "setup", loop on this step, otherwise continue. |
| S9 | Return to the main routine. |
| | Single Calculation Subroutine |
| C1 | If, from Formulae 7 and 8 and the stored data, it is determined that the current position is not covered by the map, activate the text display 24 to inform the user that the current position is off the map and return to the main routine, otherwise continue. |
| C2 | From Formula 2 and the stored data, calculate the map position (x, y) and store it in the RAM 34. |
| C3 | From the stored data, convert the style of the map position to (X, Y) and store it in the RAM 34. |
| C4 | Calculate a fractional part ($f_x$, $f_y$) of the map position within the grid block (X, Y) and store it in the RAM 34. |
| C5 | Activate the text display 24 to inform the user of the name of the map and the stored map position (X, Y). |
| C6 | Activate that pixel 38 of the graphical display 26 corresponding to the stored fractional part ($f_x$, $f_y$) of the map position. |
| C7 | Return to the main routine. |
| | Multi Calculation Subroutine |
| M1 | Set a counter C to 0. |
| M2 | For each set s of the S sets of maps:- |
| M3 | ● For each map m in the M maps of set s: |
| M4 | ● ● If, from Formulae 7 and 8 and the stored data, it is determined that the current |

-continued

| | | |
|---|---|---|
| M5 | ● ● | position is not covered by that map m in that set s, jump to Step M10. Increment the counter C. |
| M6 | ● ● | Store the name of map m in set s as $N_c$. |
| M7 | ● ● | From Formula 2 and the stored data, calculate the position ($x_c$, $y_c$) and store it in the RAM 34. |
| M8 | ● ● | From the stored data, convert the style of the map position to ($X_c$, $Y_c$) and store it in the RAM 34. |
| M9 | ● ● | If C = 1, calculate the fractional part ($f_x$, $f_y$) of the map position within the grid block ($X_i$, $Y_i$) and store it in the RAM 34. |
| M10 | ● | Next m |
| M11 | | Nexts |
| M12 | | Activate the text display 24 to inform the user of the name of the series of maps or atlas. |
| M13 | | For each map 1 from 1 to C:- |
| M14 | ● | Activate the text display 24 to inform the user of the name $N_i$ of the map. |
| M15 | ● | Activate the text display 24 to inform the user of the stored map position ($X_i$, $Y_i$). |
| M16 | | Next 1. |
| M17 | | Activate that pixel 38 of the graphical display 26 corresponding to the stored fractional part ($f_x$, $f_y$) of the map position on map $N_1$. |
| M18 | | Return to the main routine. |

Example Display

In the case of the position of the old UK Patent Office Building on the A–Z Master Atlas of Greater London, as mentioned above, an example of the display which might be produced is shown in FIG. 5. The top part of the text display 24 shows the name of the atlas. This is followed by the names of those maps (page numbers) which show that position and, for each page number, the grid block which contains that position. The example display assumes that the data which is read from the atlas contains the data for the large scale set of maps, then for the medium scale set of maps, and then for the small scale set of maps. The graphical display 26 shows the relative position within the grid block of the first map which is listed, i.e. within Block G 2 on Page 173.

Modifications and Developments

In the arrangements described above, the data associated with the maps is machine-readable. Alternatively, the data may be provided as user-readable encoded text, and the apparatus may have a key pad or the like to enable a user to enter the encoded text, the text then being decoded by the MPU 28.

In the case where more than one map or atlas page covers a particular position, the apparatus may be arranged to display the details (including the position in the grid block on the graphical display 26) of only a selected one of the maps or pages, but with an indication that others are available. A push button may then be provided so that the user can cycle through the available details. Also, in the case where the map positions related to different sets of the maps, and the selected map ceases to cover the current position, the MPU 28 may be programmed initially to select for display another map from the same series.

As described above, the graphical display 26 shows only the current relative position in the grid block. Alternatively, it may be arranged also to show previous positions so that a trail is built-up as the user moves their position, with the current position displayed differently to the previous positions, for example blinking. In this case, a push bottom may be provided whose operation causes the previous position to be cleared if the display becomes too cluttered.

The apparatus may be modified so as to display the current position also in terms of latitude and longitude.

The data which is associated with each map may be encrypted, and the MPU 28 may be programmed to perform a suitable decryption algorithm so as to hinder the use of unauthorised data.

In the embodiment described above, the MPU 28 tests each of the maps in a predetermined order to determine which of the maps covers the current position. Once a map has been found which covers the current position, if that map then ceases to cover it, the current position should be covered by a map covering an adjacent part of the earth's surface. Accordingly, the data provided for each map may also include information on the maps covering adjacent areas, and the MPU 28 may be programmed to use that information in order to increase the speed with which the next map may be found.

For maps drawn according to some cartographic projections, Formula 2 above based on a flat-earth model may not be appropriate. In order to deal with this, The MPU 28 may be programmed to be able to perform different transformation functions, for example for flat-earth, Mercator and transverse Mercator, and the data associated with each map or series of maps or atlas may include parameters defining the transformation function to be used for that map, or that series of maps or atlas, or for particular sets of maps in the series of atlas. Alternatively, the data may include the transformation function(s) itself, which is then loaded into the apparatus when the data is read.

The information which is provided so that the relationship between the wide-area co-ordinate system and the map's co-ordinate system need not be of the form described with reference to Formula 2 above. Instead, it may consist of the wide-area co-ordinates of a predetermined position on the map, the north direction on the map, and the scale of the map.

The apparatus need not include a GPS receiver, but instead may have an input to receive an output from a separate GPS receiver. Also, the apparatus may be built in to some other apparatus having other functions. Furthermore, the display may be separately housed, for example on the dashboard of a vehicle, whilst other parts of the apparatus are mounted elsewhere.

The invention may be put into effect by providing an accessory for a standard palm-top computer, such as a Psion Organiser. The accessory may comprise a GPS receiver connected to an interface card which may be inserted into one of the card slots of the palm-top computer. Accordingly, the computer, interface card and GPS receiver can perform the functions described above, with the display of the palm-top computer being used to provide both the text display 24 and the graphical display 26 described above.

It will be appreciated that many other modifications and developments may also be made and that the description above is not to be taken as limiting the scope of the invention.

What is claimed is:

1. Position indicating apparatus for use with a plurality of predetermined printed map sheets, each of which is divided into a plurality of grid blocks which are referenced by a respective grid reference, the apparatus comprising:

a body which is positionable over different portions of each map sheet and which is provided with a window through which a grid block of a said map sheet will be visible;

position sensing means operable to receive signals from a positioning system and for generating therefrom a position indicating signal indicative of the geographical location of said body, storage means for storing data associated with said map sheets and which relates to the respective geographical areas covered by the respective map sheets of said plurality;

processing means for processing said position indicating signal with said stored data for generating first output data indicative of which of said map sheets includes the geographical location indicated by said position indicating signal and indicative of the grid reference of the grid block of the indicated map sheet which contains said geographical location and second output data indicative of the position of said geographical location within the indicated grid block;

output means for outputting to a user information corresponding to said first output data for enabling the user to select the indicated map sheet and to position said window of said body over said indicated grid block of said map sheet; and a movable indicator responsive to said second output data for providing within said window a visual indication of the position of said geographical location within said indicated grid block of said map sheet;

wherein said position sensing means is operable to receive signals from said positioning system in terms of a wide area coordinate system, wherein said storage means in operable to store conversion data relating said wide area coordinate system to the coordinate system of the indicated map sheet and wherein said processing means is operable for generating output data using said conversion data, which output data is indicative of the grid block of the indicated map sheet and is in terms of the map coordinate system of the indicated map sheet.

2. An apparatus according to claim 1, wherein in the event that said geographical location is contained in a plurality of said map sheets, said processing means is operable to generate first output data indicative of which of said map sheets includes the geographical location and indicative of the grid reference of the grid block of each of those indicated map sheets, which contains said geographical location and wherein said output means is operable to output to said user information corresponding to said first output data for enabling the user to select one of the indicated map sheets.

3. An apparatus according to claim 2, comprising user input means for allowing said user to select one of said indicated map sheets, and wherein said movable indicator means is responsive to a user selection for providing within said window a visual indication of the position of said geographical location within the indicated grid block of the selected map sheet.

4. An apparatus according to claim 3, wherein said input means comprises a push bottom which allows a user to cycle through each of said indicated map sheets.

5. An apparatus according to claim 1, further comprising means for receiving said data relating to the respective geographical areas covered by the respective map sheets of said plurality.

6. An apparatus according to claim 1, for use with map sheets which are not all to the same scale and for use with such conversion data which takes into account the different scales of the maps, wherein said processing means is operable to take into account the scale of the map sheets in generating said second output data in terms of the map coordinates system of the indicated map.

7. An apparatus according to claim 1, wherein said output means comprises a liquid crystal display for graphically displaying said information corresponding to said first output data.

8. An apparatus according to claim 1, wherein said window comprises a transparent liquid crystal display.

9. An apparatus according to claim 8, wherein said moveable indicator means is operable to display previous positions of said body within said indicated grid block.

10. An apparatus according to claim 1, for use with said plurality of printed map sheets without a digitizing tablet.

11. In combination, a plurality of predetermined printed map sheets in combination with a position indicating apparatus according to claim 9 configured and arranged for use with said predetermined printed map sheets.

12. Position indicating apparatus for use with a plurality of predetermined printed map sheets, each of which is divided into a plurality of grid blocks which are referenced by a respective grid reference, the apparatus comprising:

a body which is positionable over different portions of each map sheet and which is provided with a window through which a grid block of a said map sheet will be visible;

position sensing circuitry operable to receive signals from a positioning system and for generating therefrom a position indicating signal indicative of the geographical location of said body;

a memory for storing data associated with said map sheets and which relates to the respective geographical areas covered by the respective map sheets of said plurality;

a processor for processing said position indicating signal with said stored data for generating first output data indicative of which of said map sheets includes the geographical location indicated by said position indicating signal and indicative of the grid reference of the grid block of the indicated map sheet which contains said geographical location and second output data indicative of the position of said geographical location within the indicated grid block;

output circuitry for outputting to a user information corresponding to said first output data for enabling the user to select the indicated map sheet and to position said window of said body over said indicated grid block of said map sheet; and a movable indicator responsive to said second output data for providing within said window a visual indication of the position of said geographical location within said indicated grid block of said map sheet;

wherein said position sensing circuitry is operable to receive signals from said positioning system in terms of a wide area coordinate system, wherein said memory is operable to store conversion data relating said wide area coordinate system to the coordinate system of the indicated map sheet and wherein said processor is operable for generating output data using said conversion data, which output data is indicative of the grid block of the indicated map sheet and is in terms of the map coordinate system of the indicated map sheet.

13. An apparatus according to claim 12, wherein in the event that said geographical location is contained in a plurality of said map sheets, said processor is operable to generate first output data indicative of which of said map sheets includes the geographical location and indicative of the grid reference of the grid block of each of those indicated map sheets, which contains said geographical location and wherein said output circuitry is operable to output to said user information corresponding to said first output data for enabling the user to select one of the indicated map sheets.

14. An apparatus according to claim 13, comprising a user interface for allowing said user to select one of said indicated map sheets, and wherein said movable indicator is responsive to a user selection for providing within said window a visual indication of the position of said geographical location within the indicated grid block of the selected map sheet.

15. An apparatus according to claim 14, wherein said user interface comprises a push bottom which allows a user to cycle through each of said indicated map sheets.

16. An apparatus according to claim 12, further comprising circuitry for receiving said data relating to the respective geographical areas covered by the respective map sheets of said plurality.

17. An apparatus according to claim 12, for use with map sheets which are not all to the same scale and for use with such conversion data which takes into account the different scales of the maps, wherein said processor is operable to take into account the scale of the map sheets in generating said second output data in terms of the map coordinate system of the indicated map.

18. An apparatus according to claim 12, wherein said output circuitry comprises a liquid crystal display for graphically displaying said information corresponding to said first output data.

19. An apparatus according to claim 12, wherein said window comprises a transparent liquid crystal display.

20. An apparatus according to claim 19 wherein said moveable indicator is operable to display previous positions of said body within said indicated grid block.

21. A method of indicating a position of a user on at least one of a plurality of predetermined printed map sheets, using a position indicating apparatus having a body which is positionable over different portions of each map sheet and which is provided with a window through which a grid block of a said map sheet will be visible, the method comprising the steps of:

receiving signals from a positioning system and generating therefrom a position indicating signal indicative of the geographical location of said body;

storing data associated with said predetermined map sheets which relates to the respective geographical areas covered by the respective map sheets of said plurality;

processing said position indicating signal with said stored data to generate first output data indicative of which of said map sheets includes the geographical location indicated by said position indicating signal and indicative of the grid reference of the grid block of the indicated map sheet which contains said geographical location and second output data indicative of the position of said geographical location within the indicated grid block;

outputting to the user information corresponding to said first output data;

selecting the indicated map sheet;

positioning said window of said body over said indicated grid block of said map sheet; and providing a movable indicator responsive to said second output data to provide within said window a visual indication of the position of said geographical location within said indicated grid block of said map sheet;

wherein said receiving step receives signals from said positioning system in terms of a wide area coordinate system, wherein said storing step stores conversion data relating said wide area coordinate system to the coordinate system of the indicated map sheet and wherein said processing step generates output data using said conversion data, which output data is indicative of the grid block of the indicated map sheet and is in terms of the map coordinate system of the indicated map sheet.

22. A method according to claim 21, wherein in the event that said geographical location is contained in a plurality of said map sheets, said processing step generates first output data indicative of which of said map sheets, includes the geographical location and indicative of the grid reference of the grid block of each of those indicated map sheets, contains said geographical location and wherein said output step outputs to said user information corresponding to said first output data for enabling the user to select one of the indicated map sheets.

23. A method according to claim 22, comprising the step of selecting one of said indicated, map sheets and wherein said moveable indicator is responsive to the selection for providing within said window a visual indication of the position of said geographical location within the indicated grid block of the selected map sheet.

24. A method according to claim 23, wherein the user uses a push bottom to cycle through each of said indicated map sheets to make said selection.

25. A method according to claim 21, further comprising the step of receiving said data relating to the respective geographical areas covered by the respective map sheets of said plurality.

26. A method according to claim 21, wherein said map sheets are not all to the same scale, wherein said storing step stores such conversion data which takes into account the different scales of the map sheets and wherein said processing step takes into account the scale of the map sheets in generating said second output data in terms of the map coordinate system of the indicated map.

27. A method according to claim 21, wherein said output step uses a liquid crystal display to graphically display said information corresponding to said first output data.

28. A method according to claim 27, wherein said window comprises a transparent liquid crystal display.

29. A method according to claim 28, further comprising the step of displaying previous positions of said body within said indicated grid block.

* * * * *